(12) United States Patent
Moore

(10) Patent No.: US 11,946,501 B2
(45) Date of Patent: Apr. 2, 2024

(54) SYSTEMS AND METHODS FOR ASSEMBLING A HAMMER TOOL

(71) Applicant: Caterpillar Inc., Peoria, IL (US)

(72) Inventor: Cody Moore, Lorena, TX (US)

(73) Assignee: Caterpillar Inc., Peoria, IL (US)

( * ) Notice: Subject to any disclaimer, the term of this patent is extended or adjusted under 35 U.S.C. 154(b) by 120 days.

(21) Appl. No.: 17/482,449

(22) Filed: Sep. 23, 2021

(65) Prior Publication Data
US 2023/0092273 A1 Mar. 23, 2023

(51) Int. Cl.
F16B 31/04 (2006.01)
E02F 3/36 (2006.01)
E02F 3/96 (2006.01)

(52) U.S. Cl.
CPC .......... F16B 31/043 (2013.01); E02F 3/3604 (2013.01); E02F 3/966 (2013.01)

(58) Field of Classification Search
CPC ...... F16B 31/043; F16B 31/04; F16B 35/041; E02F 3/3604; E02F 3/966; B25D 2250/121; B25D 2250/361; B25D 17/00
See application file for complete search history.

(56) References Cited

U.S. PATENT DOCUMENTS

| | | | | | |
|---|---|---|---|---|---|
| 2,060,593 | A | * | 11/1936 | Schaurte | F16B 31/06 411/389 |
| 5,083,889 | A | * | 1/1992 | Steinbock | F16B 31/04 411/917 |
| 7,354,054 | B2 | * | 4/2008 | Pazdirek | B60G 21/0551 280/124.152 |
| 9,279,232 | B2 | * | 3/2016 | Jagdale | E02F 3/966 |
| 9,321,161 | B2 | * | 4/2016 | Ceney | B25B 13/06 |
| 10,989,246 | B2 | * | 4/2021 | Sicard | F16B 35/005 |
| 11,389,916 | B1 | * | 7/2022 | Moore | B23P 19/067 |
| 2006/0283612 | A1 | * | 12/2006 | Pillers | B25D 17/08 173/128 |

(Continued)

FOREIGN PATENT DOCUMENTS

| | | |
|---|---|---|
| JP | 05240382 A | 9/1993 |
| JP | 2009255265 A | 11/2009 |

OTHER PUBLICATIONS

Written Opinion and International Search Report for Int'l. Patent Appln. No. PCT/US2022/042107, dated Dec. 19, 2022 (12 pgs).

*Primary Examiner* — Thomas M Wittenschlaeger
*Assistant Examiner* — Katie L Gerth

(57) ABSTRACT

Systems and methods can include stretching a stud of a hammer assembly by tightening, according to a preset amount, a plurality of fasteners, which can extend from a first end surface and/or a second end surface of a first nut threadedly coupled to the stud, against an upper surface of a body of the hammer assembly. The fasteners and the first nut can provide a clamping load for the stud upon completion of the tightening. The systems and methods can also include, after the stretching, tightening a second nut, which can be threadedly connected to the stud, toward a seat formed in the body of the hammer assembly; and further tightening the second nut, against the seat. The systems and methods can further include transferring the clamping load from the fasteners and first nut to the second nut.

11 Claims, 9 Drawing Sheets

(56) References Cited

U.S. PATENT DOCUMENTS

| | | | | |
|---|---|---|---|---|
| 2009/0053009 | A1* | 2/2009 | Steinbock | B30B 15/045 411/432 |
| 2010/0000375 | A1* | 1/2010 | Steinbock | B23P 19/067 81/57.38 |
| 2010/0269563 | A1* | 10/2010 | Kirchner | B30B 15/045 72/455 |
| 2014/0102740 | A1* | 4/2014 | Jagdale | E02F 3/966 173/114 |
| 2014/0138927 | A1* | 5/2014 | Poloni | C21C 5/50 280/93.51 |
| 2014/0208575 | A1* | 7/2014 | Jagdale | E02F 3/966 411/103 |
| 2014/0338501 | A1* | 11/2014 | Ceney | B25B 29/02 81/53.2 |
| 2017/0203427 | A1* | 7/2017 | Tang | E02F 3/966 |
| 2018/0206897 | A1* | 7/2018 | Palmer | A61B 17/8685 |
| 2019/0257345 | A1* | 8/2019 | Ploke | F16B 31/04 |
| 2020/0158159 | A1* | 5/2020 | Sicard | F16B 37/125 |
| 2020/0355205 | A1* | 11/2020 | Ma | F16B 35/041 |
| 2021/0008676 | A1* | 1/2021 | Greenwell | F16B 31/043 |

* cited by examiner

SYSTEMS AND METHODS FOR ASSEMBLING A HAMMER TOOL

TECHNICAL FIELD

The present disclosure relates to systems and methods for assembling a hammer tool. More particularly, the present disclosure relates to systems and methods for tensioning one or more tie rods for a hammer tool.

BACKGROUND

Hammer tie rods are relatively large fasteners that provide clamp loads to a hammer body. Hammer tie rods typically require high torque values to achieve a desired clamping load. In some cases, the torque value can reach 20,000 foot-pounds (e.g., between 15,000-20,000 foot-pounds). However, such high torque values may be difficult to achieve during assembly of the hammer body. Moreover, such high torque values may damage the threading of a nut or collar that may fasten an end of the tie rod to the hammer body, which can change the amount of clamp load achieved by the nut or collar.

U.S. Pat. No. 9,321,161 ("the '161 patent") describes an apparatus and a kit for tensioning a stud in a bolted joint to a desired preload. According to the '161 patent, the apparatus comprises a locking means adapted for engagement with the stud, a removable bridge member arranged to at least partially enclose the locking means and to receive the stud therethrough, a removable actuator operable to actuate the locking means through the bridge member, and removable tensioning means configured to apply tension to a load bearing surface of the bridge member so as to transfer tension to the stud, such that the actuator is operable to lock the locking means when the desired preload in the stud is achieved.

SUMMARY

In one aspect, a method is disclosed or can be implemented. The method can comprise: stretching a stud of a hammer assembly by tightening, according to a preset amount, a plurality of jack bolts, which extend from a first end surface of a first nut threadedly coupled to the stud, to press against an upper surface of a body of the hammer assembly, the jack bolts and first nut providing a clamping load for the stud upon completion of said stretching; after said stretching, tightening a second nut, which is threadedly connected to the stud, toward a seat formed in the body of the hammer assembly; further tightening the second nut, against the seat, using a tightening tool; and transferring the clamping load from the jack bolts and first nut to the second nut.

In another aspect, a method is disclosed or can be implemented. The method can comprise: threading a collar assembly, which includes a first collar and a plurality of fasteners extending through respective threaded holes of the first collar, onto a first threaded portion of a tie rod such that the collar assembly directly contacts an upper surface of a body of a hammer assembly; tightening the fasteners against the upper surface of the body of the hammer assembly to stretch the tie rod and move a second collar, which is threaded onto a second threaded portion of the tie rod, away from a ledge inside the body of the hammer assembly by a predetermined distance; after said tightening the fasteners, hand-tightening the second collar to be in direct contact with the ledge formed inside the body of the hammer assembly and such that a portion of the body of the hammer assembly is around an outer sidewall of the second collar; and after said hand-tightening the second collar to be in direct contact with the ledge formed inside the body of the hammer assembly, further tightening the second collar against the ledge using a tightening tool.

In yet another aspect a tie rod torque system can be disclosed or provided. The system can comprise: a collar assembly including a first collar and a plurality of fasteners extending through respective threaded holes of the first collar; and a hydraulic hammer assembly. The hydraulic hammer assembly can include: a body and a plurality of tie rods running in a length-wise direction of the body at respective corner portions of the body. Each of the tie rods can include at a proximal end portion thereof: a first threaded portion having a first diameter, a second threaded portion having a second diameter, and a first non-threaded portion between the first threaded portion and the second threaded portion, the first non-threaded portion having a diameter less than the first diameter and the second diameter. and. The hydraulic hammer assembly can also include a plurality of second collars threadedly connected to the second threaded portion of respective ones of the tie rods. The first collar can be configured to be removably threadedly connected individually to the first threaded portion of each of the tie rods.

And in yet another aspect, a kit for assembly of a hammer tool can be provided or implemented. The kit can comprise a collar assembly including a first collar and a plurality of jack bolts, which may extend through respective threaded holes of the first collar, where the first collar can be threadedly connectable individually to a first threaded portion of each of one or more studs of the hammer tool. The kit can also comprise one or more second collars that are threadedly connectable to a second threaded portion of respective ones of the one or more studs.

DETAILED DESCRIPTION

Hammers, such as hydraulic hammers, are generally employed on worksites to demolish and break up hard objects, including rocks, concrete, asphalt, and frozen ground. The hammers may be mounted to machines, such as excavators and backhoes, for example. The hammers may alternatively be powered by pneumatic pressure sources, rather than only hydraulic sources. In either event, a high-pressure fluid may be utilized within the hammer to cyclically drive a piston to strike a work tool, which, in turn, may carry an impulse wave to the object of demolition for breaking that object into smaller pieces, for instance, for easier removal from a worksite.

As noted above, embodiments of the disclosed subject matter relate to systems and methods for assembling a hammer tool. In particular, embodiments of the present disclosure relate to systems and methods for tensioning one or more tie rods for a hammer tool.

Figure 1:
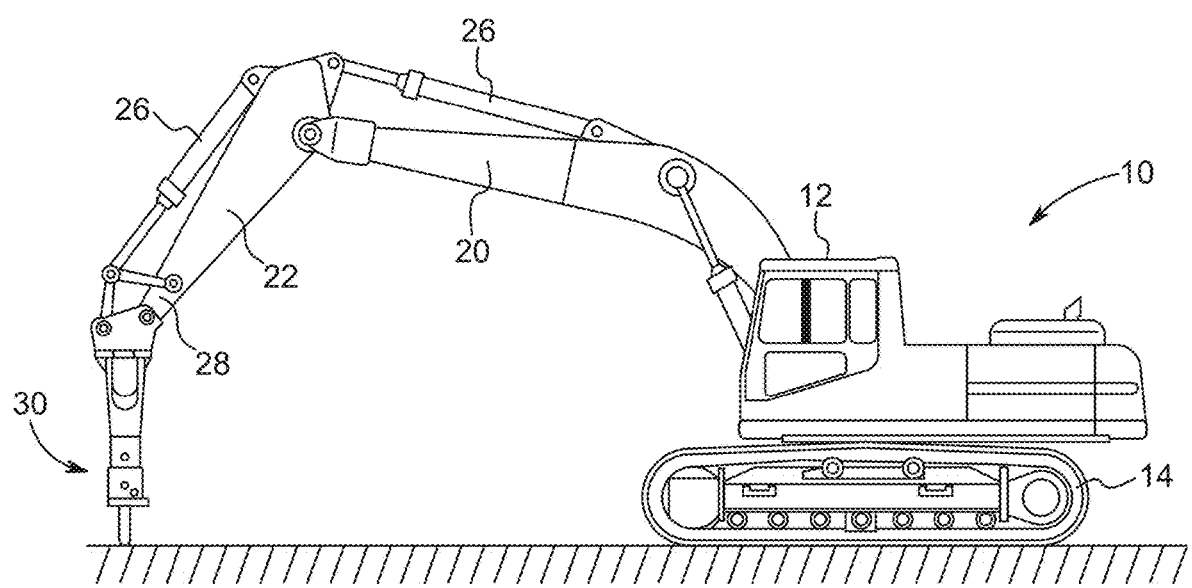
FIG. 1 is a side view of an excavating machine having a hammer assembly that may implement systems and methods according to embodiments of the disclosed subject matter.

Referring now to FIG. 1, an excavating machine 10 used to dig and remove rock and soil from a construction worksite is shown. The excavating machine 10 may incorporate a cab body 12 containing, for instance, an operator station and operating controls. The excavating machine 10 may be supported by, and may move on, tracks 14. An extensible boom 20 may be movably anchored to the cab body 12, and an articulating stick 22, which may be referred to as a lift arm, may be secured to and supported for movement on the extensible boom 20.

The excavating machine 10 may incorporate a tool in the form of a hammer assembly 30, as depicted, for instance, at an operational end 28 of the articulating stick 22. The hammer assembly 30 can be a fluid-powered hammer, for instance, hydraulic-powered or pneumatic-powered. Thus, the hammer assembly 30 can be a hydraulic hammer or a pneumatic hammer assembly. Cylinder actuators 26 may be utilized to move the articulating stick 22 relative to the extensible boom 20, and to move the hammer 30 relative to the articulating stick 22. Like the hammer assembly 30, the cylinder actuators 26 can be hydraulic- or pneumatic-powered cylinder actuators.

Figure 2:
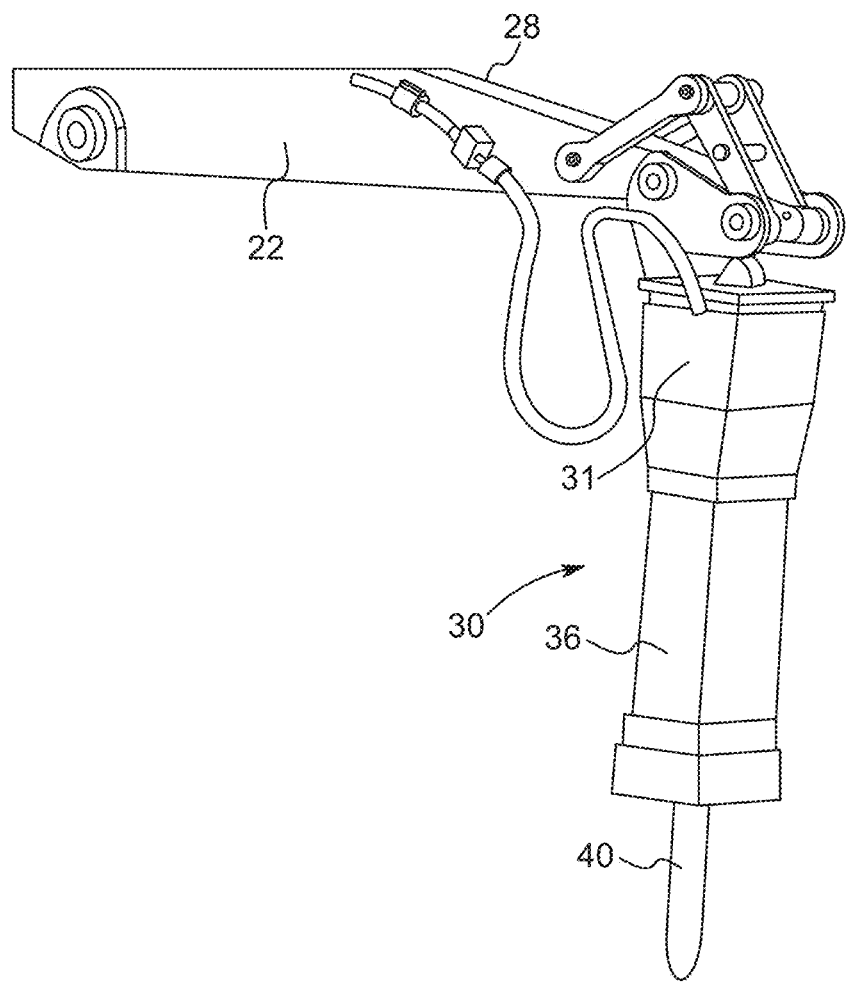
FIG. 2 is a perspective view of the hammer assembly of FIG. 1, which can implement systems and methods according to embodiments of the disclosed subject matter.

Referring now also to FIG. 2, the hammer assembly 30 can include an upper portion 31 and a lower portion 36, which may be referred to as a back head portion and a front head portion, respectively. A hammer tool 40 having an upper end may be operatively connected to the lower portion 36 of the hammer assembly 30. Generally, the hammer tool 40 can be actuated to produce cyclic vibrational movement at an intensity sufficient to demolish hard objects, such as rocks.

Figure 3:
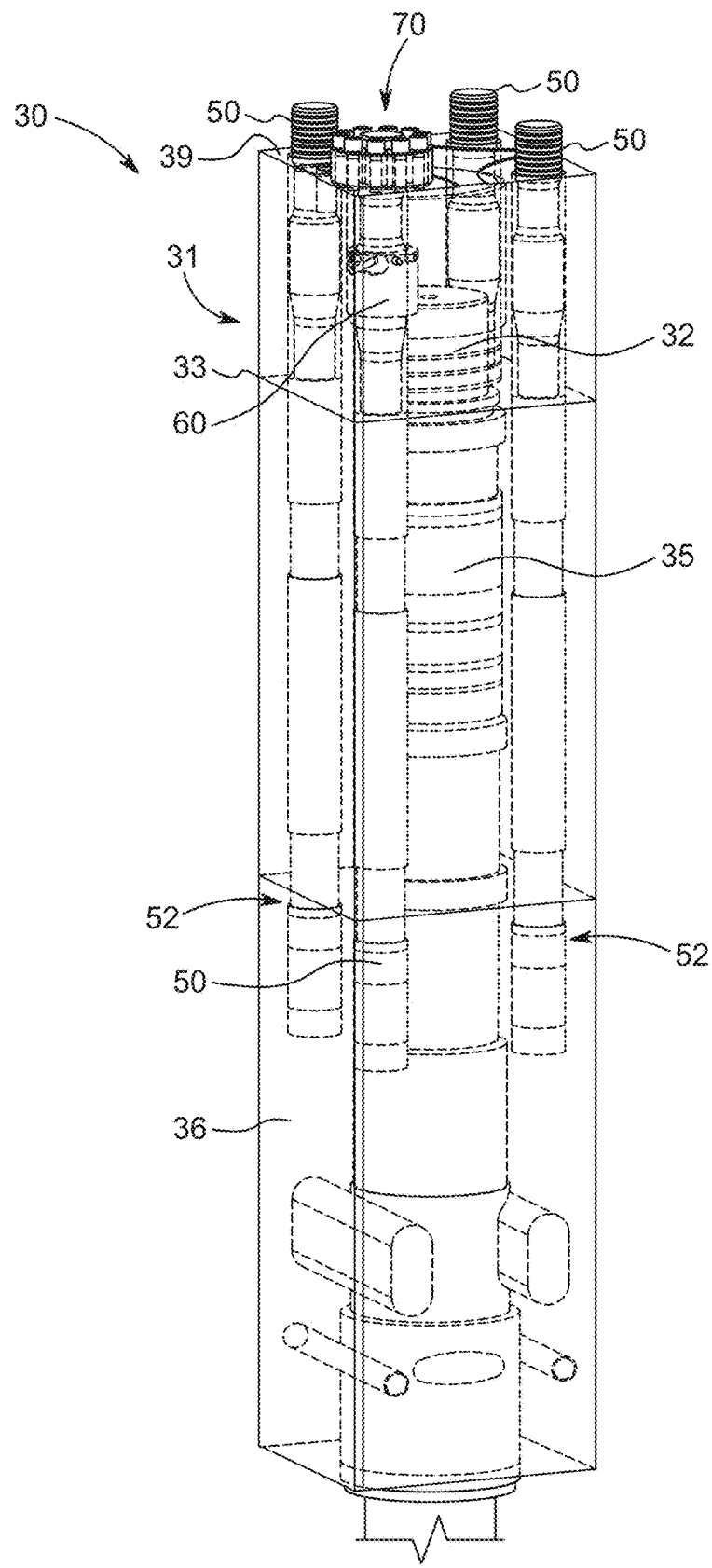
FIG. 3 is a transparent perspective view of a hammer assembly and a collar assembly according to embodiments of the disclosed subject matter.

FIG. 3 shows the hammer assembly 30, in relevant part, detached from the articulating stick 22 and with transparent sidewalls for the upper portion 31 and the lower portion 36. The sidewalls of the upper portion 31 and/or the sidewalls of the lower portion 36 may be referred to or characterized as a body 33 of the hammer assembly 30 or part of the body 33 of the hammer assembly 30. As shown, the hammer assembly 30 can include a power cell 32 and a piston within a sleeve 35 (provided in the body 33 of the hammer assembly 30). The power cell 32 may utilize a suitable working fluid, such as a hydraulic and/or pneumatic fluid, to reciprocally impact the piston against an upper end of the hammer tool 40 to drive the hammer tool 40.

Also shown in FIG. 3, the hammer assembly 30 can include a plurality of tie bars or rods 50, which may be referred to or characterized as studs. The tie rods 50 can extend or run in a longitudinal or length-wise direction of the hammer assembly 30, such as shown in FIG. 3. The tie rods 50 also may be circumferentially disposed around the sleeve 35, for instance, at respective corner portions of the body 33 of the hammer assembly 30. Generally, the tie rods 50 can retain or hold the upper portion 31 and the lower portion 36 together (along with the power cell 32). FIG. 3 shows four tie rods 50, though embodiments of the disclosed subject matter are not limited to four tie rods 50.

Figure 4:
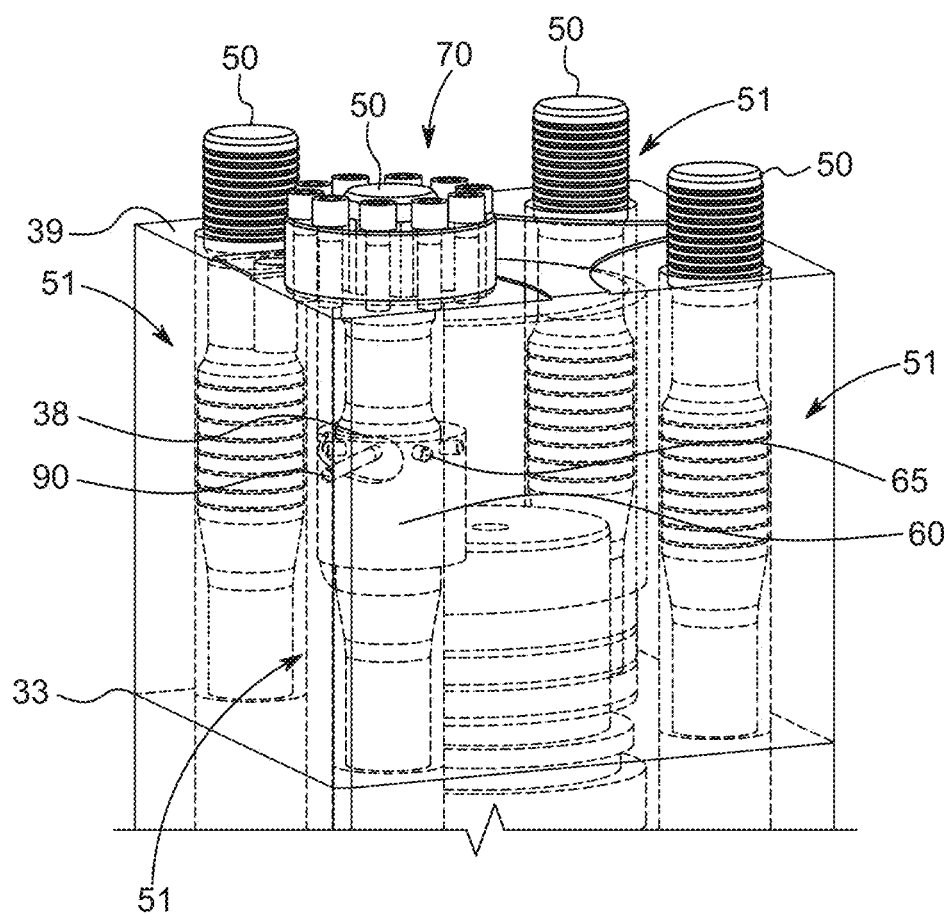
FIG. 4 is a partial perspective view of the hammer assembly and the collar assembly of FIG. 3.

Referring also to FIG. 4, each of the tie rods 50 can include a first end portion 51 and a second end portion 52 opposite the first end portion 51. The first end portion 51 may be closer to the articulating stick 22 than the second end portion 52 is to the articulating stick 22. The first end portion 51 and the second end portion 52 of the tie rod 50, therefore, may be referred to as a proximal end portion and a distal end portion, respectively, relative to the articulating stick 22. The second end portion 52 of each tie rod 50 can be secured to the lower portion 36 of the hammer assembly 30, for instance, via a nut or threaded collar threadedly connected to the second end portion 52 of the tie rod and engaged with the body 33 of the hammer assembly 30.

Figure 5:
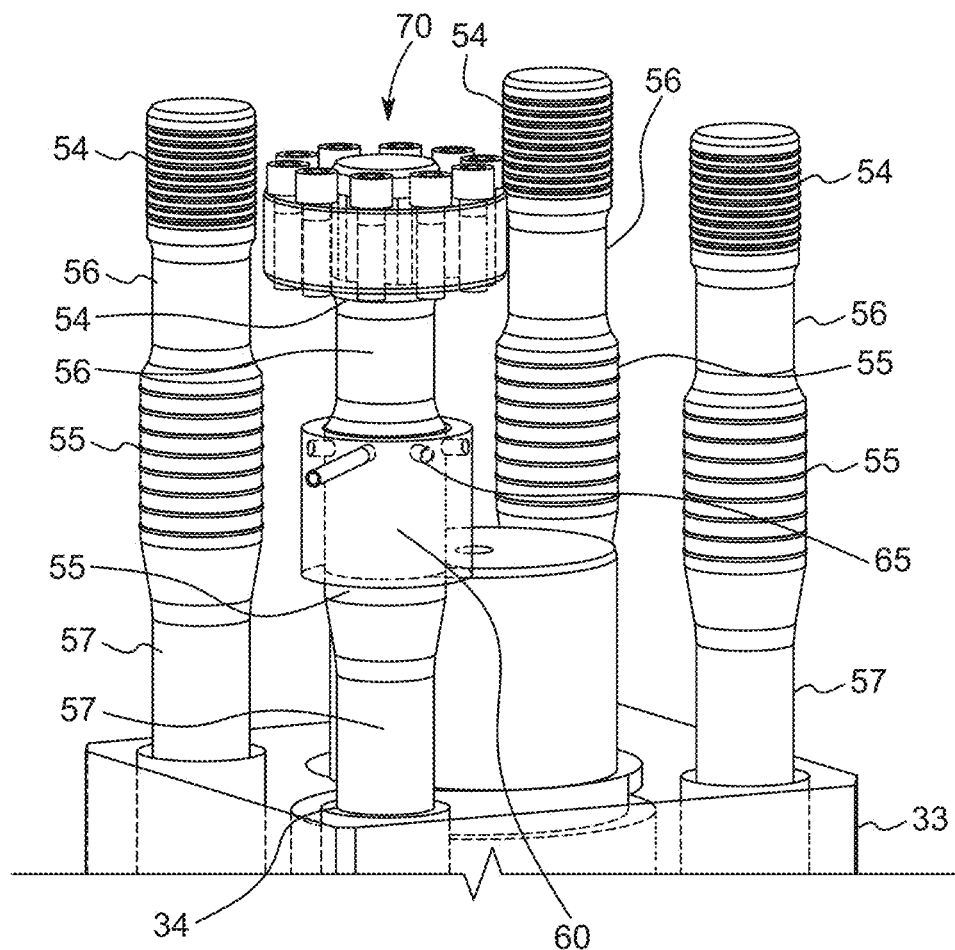
FIG. 5 is another partial perspective view of the hammer assembly and the collar assembly of FIG. 3.
Figure 6:
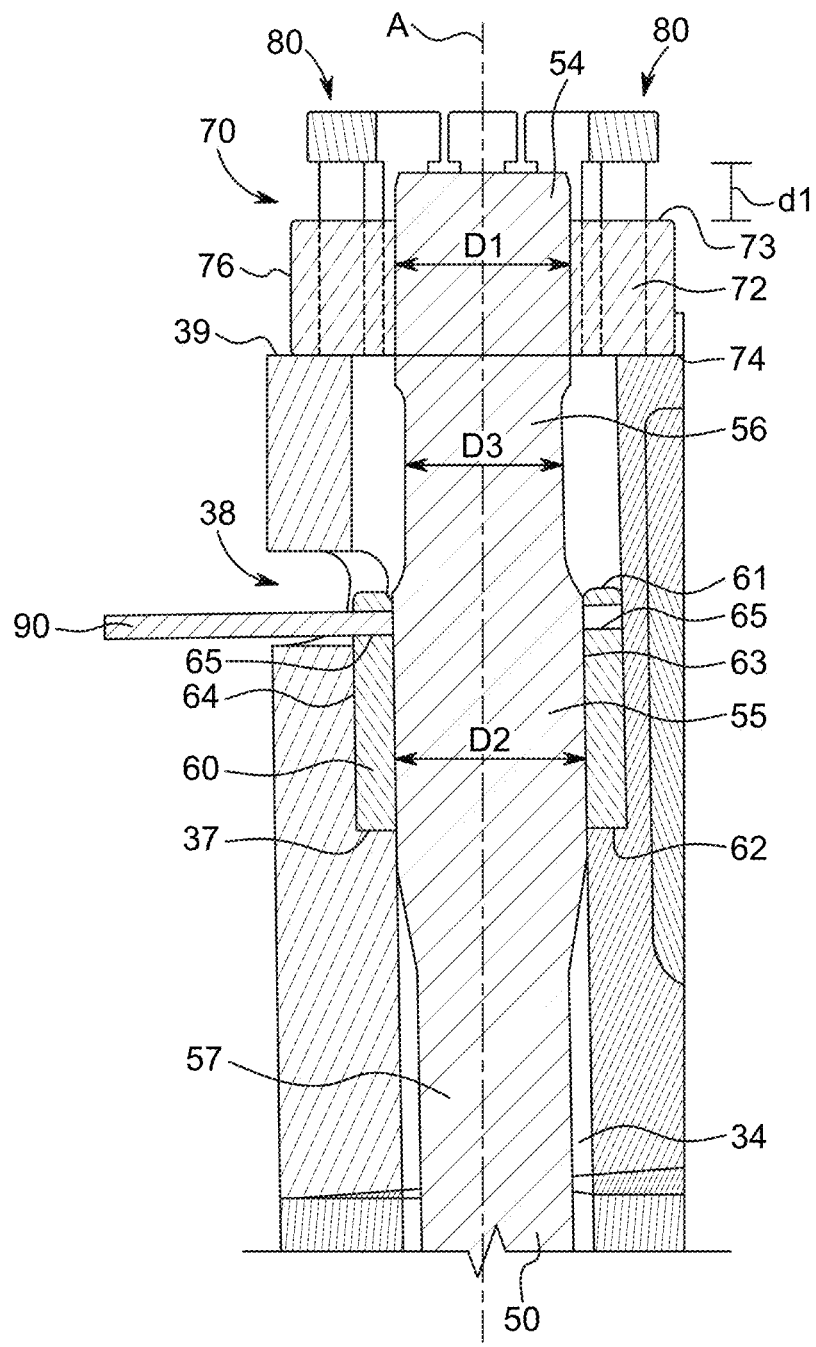
FIG. 6 is a partial sectional view of the hammer assembly and the collar assembly of FIG. 3.

Referring now to FIGS. 4-6, the first end portion 51 of the tie rod 50 can include a first threaded portion 54 and a second threaded portion 55. The first threaded portion 54 may be distinct from the second threaded portion 55. For instance, the second threaded portion 55 may be separated from the first threaded portion 54 and/or have a different thread pattern. Optionally, a first non-threaded portion 56 may be provided between the first threaded portion 54 and the second threaded portion 55. Optionally, a second non-threaded portion 57 may be provided on a side of the second threaded portion 55 opposite the first threaded portion 54 (and the first non-threaded portion 56). Alternatively, the first threaded portion 54 can lead seamlessly to the second threaded portion 55, effectively creating a continuous threaded portion.

The first threaded portion 54 can have a first diameter D1 and the second threaded portion 55 can have a second diameter D2. The first diameter D1 and the second diameter D2 can have the same value. Alternatively, the second diameter D2 can be greater than the first diameter D1. In that the first threaded portion 54 and the second threaded portion 55 can have different diameters, these threaded portions can have different thread forms. Additionally, the second diameter D2 of the second threaded portion 55 may be greater than the first diameter D1 of the first threaded portion 54 because less strength may be needed at the first threaded portion compared to the second threaded portion when tensioning the tie rod 50 as described herein. The non-threaded portion 56 may also have a diameter D3, which may be referred to herein as a third diameter, and which may be less than the first diameter D1 and/or the second diameter D2. The diameter of the tie rod 50 may also decrease below the second threaded portion 55. The first non-threaded portion 56 may be a relief area for the tie rod 50, for instance, for manufacturing purposes.

A nut 60 can be provided for each tie rod 50. The nut 60 may be referred to herein as a second nut. The nut 60 may also be referred to or characterized as a collar or a sleeve having a threaded inner surface. The nut 60 can have a body with a first end 61, a second end 62 opposite the first end 61, an inner sidewall 63, and an outer sidewall 64. The inner sidewall 63 can have threads to thread the nut 60 onto (and off of) the second threaded portion 55 of the tie rod 50. Thus, the nut 60 can be threadedly connected or coupled to the second threaded portion 55 of the tie rod 50, such as shown in FIGS. 4-6.

When threaded onto the second threaded portion 55, the nut 60 can be provided in a bore 34 provided in (e.g., formed by) the body 33 of the hammer assembly 30 (the tie rod 50, of course, can also be provided in the bore 34). In this regard, portions of the body 33 of the hammer assembly 30 can be provided around the nut 60. For instance, portions of the body 33 can be provided adjacent to some of the outer sidewall 64 of the nut 60, such as shown in FIG. 6. Also shown in FIG. 6, the second end 62 of the nut 60 can be provided on or otherwise abut an internal seat 37 provided in (e.g., formed by) the body 33 of the hammer assembly 30. The internal seat 37 may be referred to or characterized as an internal ledge or shoulder.

Discussed in more detail below, the nut 60, when threaded onto the second threaded portion 55 such that the second end 62 contacts the internal seat 37, for instance, as shown in FIG. 6, can provide a clamping load for the tie rod 50. Also discussed below in more detail below, such clamping load may be an entirety or all of the clamping load for the tie rod 50 (at that end of the tie rod 50). Thus, during operation of the hammer tool 40, the nut 60 may remain threadedly coupled to the second threaded portion 55 of the tie rod 50, with the second end 62 thereof abutting the internal seat 37, and the body 33 provided adjacent to some of the outer sidewall 64.

The nut 60 can have a plurality of receptacles 65. Each receptacle 65, which may be in the form of a hole or an opening in at least the outer sidewall 64 of the nut 60 and optionally the inner sidewall 63 of the nut 60, such as shown in FIG. 6, can receive a removable tool 90 to adjust tightness (i.e., tighten or loosen) of the nut 60 relative to the internal seat 37. The receptacles 65 can be evenly spaced around a circumference of the nut 60. The tool 90 may not be considered part of the hammer assembly 30.

Access to the one or some receptacles 65 can be provided via a window 38 in the form of a through hole or opening (e.g., a slot) in the body 33 of the hammer assembly 30. Only one or some (i.e., not all) of the receptacles 65 may be accessed at once, depending upon the rotational position of the nut 60 and the configuration of the window 38. The tool 90 may be provided through the window 38 and engaged with one of the receptacles 65. The tool 90 can be rotated to rotate the nut 60 to adjust the tightness of the nut 60 relative to the internal seat 37. The window 38 may also be dimensioned such that one can access the nut 60 via one or more fingers. Thus, the nut 60 may be tightened by hand via the window 38 such that the second end 62 of the nut 60 initially abuts the internal seat 37, according to a first amount of torque, and further tightened against the internal seat 37 via the window 38 using the tool 90, according to a second amount of torque. The second amount of torque associated with tightening the nut 60 using the tool 90 can be greater than the first amount of torque associated with tightening the nut 60 by hand.

As shown in FIGS. 3-7, a collar or sleeve assembly 70 can be provided for one of the tie rods 50. The collar assembly 70 may be referred to as a tool and may not be considered part of the hammer assembly 30. According to one or more embodiments, only one collar assembly 70 may be provided, and the one collar assembly 70 can be used with each tie rod 50 individually and successively. Alternatively, collar assemblies 70 for each of the tie rods 50 may be provided.

The collar assembly 70 can include a nut 72 and a plurality of fasteners 80. The nut 72 may be referred to herein as a first nut. The nut 72 may also be referred to or characterized as a collar or a sleeve having a threaded inner surface.

Figure 7:
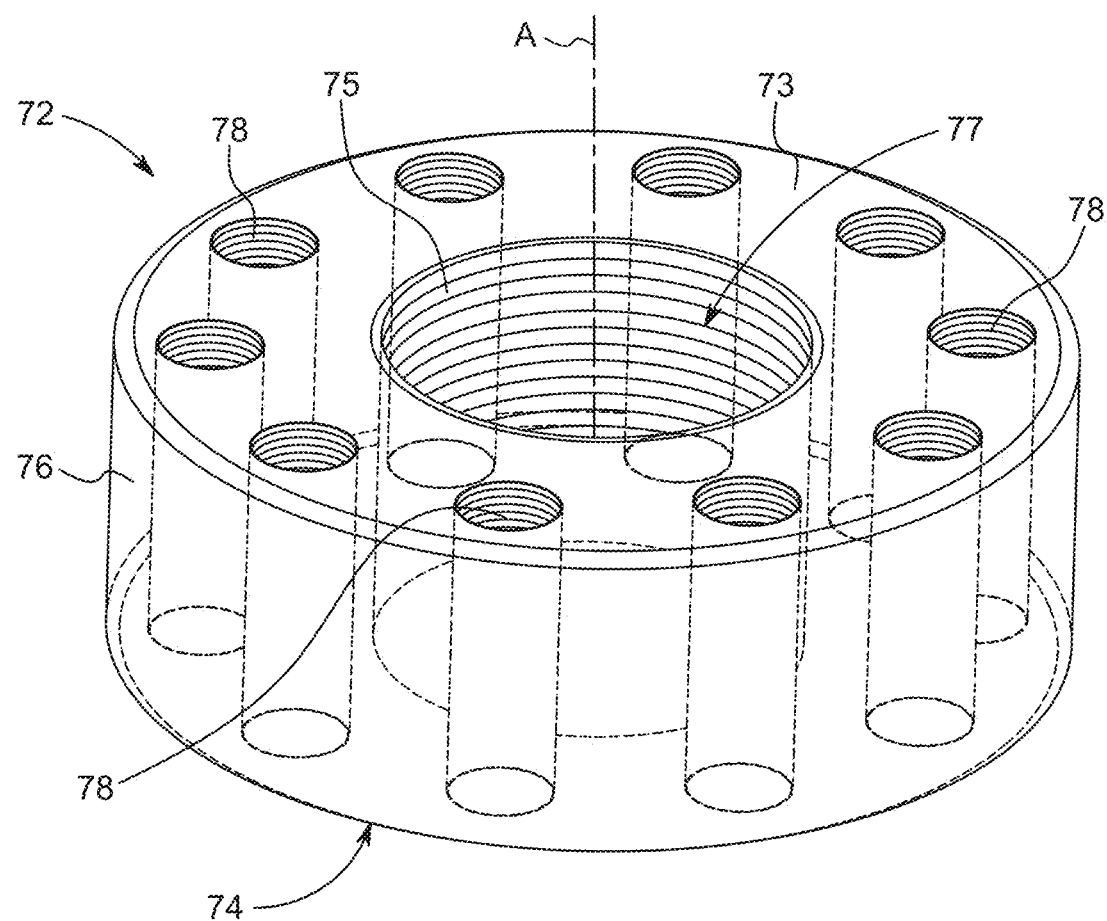
FIG. 7 is a transparent perspective view of a collar of a collar assembly according to embodiments of the disclosed subject matter.

Referring now also to FIG. 7, the nut 72 can have a body with a first end surface 73, a second end surface 74 opposite the first end surface 73, an inner sidewall 75, and an outer sidewall 76. The inner sidewall 75, which can be threaded, can define a central opening 77. A plurality of through holes 78 can extend through the body of the nut 72, from the first end surface 73 to the second end surface 74. Optionally, the nut 72 can be entirely symmetrical about a central longitudinal axis A and/or a plane perpendicular to the central longitudinal axis A.

The nut 72, via the threading of the inner sidewall 75, can be threaded onto (and off of) the first threaded portion 54 of the tie rod 50. Thus, the nut 72 can be threadedly connected or coupled to the first threaded portion 54 of the tie rod 50, such as shown in FIGS. 3-6. In this regard, the nut 72 can be threaded onto the first threaded portion 54 of the tie rod 50 with or without some or all of the fasteners 80. As one example, the nut 72 can be threaded onto the first threaded portion 54 of the tie rod 50 with all of the fasteners 80 provided in the body of the nut 72.

The first end surface 73 of the nut 72 can be entirely or partially flat or planar. For instance, the first end surface 73 of the nut 72 can be flat or planar from the through holes 78 radially inward to the inner sidewall 75. An edge between the first end surface 73 and the outer sidewall 76 can be chamfered. Additionally or alternatively, an edge between the second end surface 74 and the outer sidewall 76 can be chamfered. According to one or more embodiments, an entire length of the through holes 78 can be threaded.

The through holes 78 can be radially spaced. More specifically, the through holes 78 can be provided a same radial distance from the central longitudinal axis A passing through the central opening 77 of the nut 72 defined by the inner sidewall 75. In this regard, the through holes 78 can be evenly spaced from each other around the central longitudinal axis A, such as shown in FIG. 7.

Figure 8:
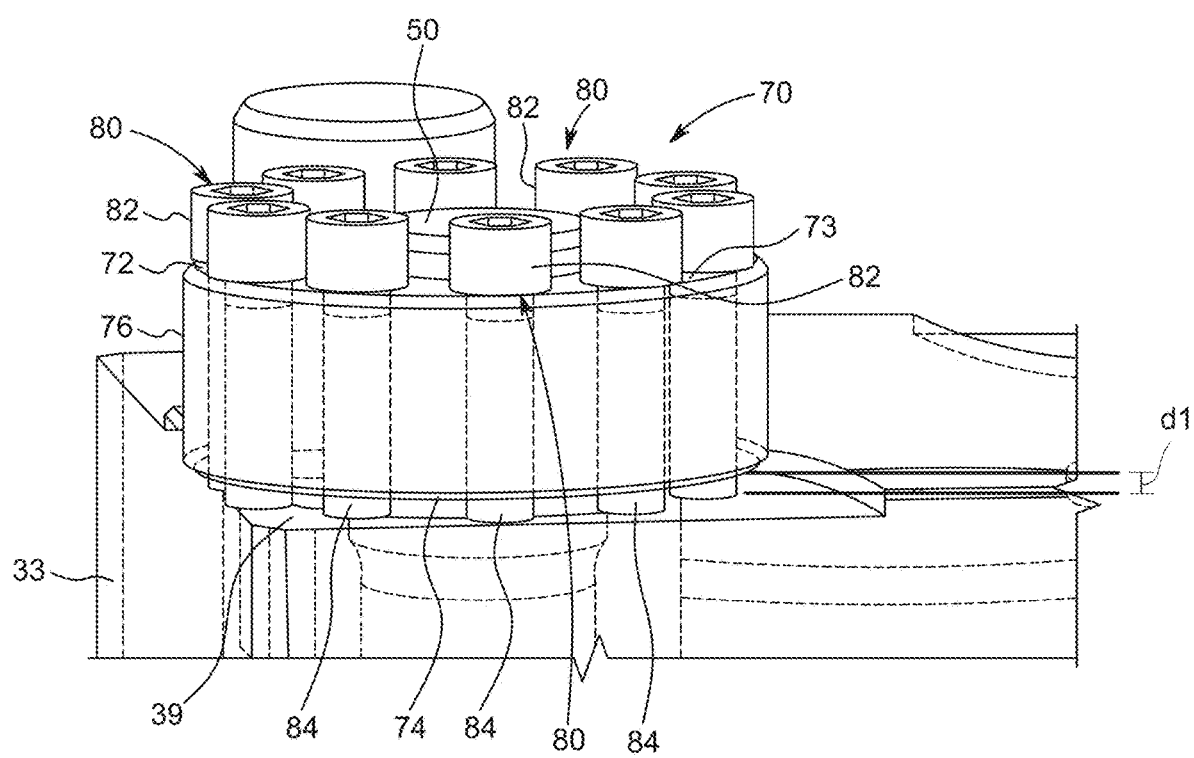
FIG. 8 illustrates tightening of the collar assembly of FIG. 7.

As shown in FIG. 8, the fasteners 80 each can have a head 82 and a threaded body 84. According to one or more embodiments, the fasteners 80 can be jack bolts, for instance, whereby the head 82 can be actuated via a hex wrench or the like. Each fastener 80, when threadedly provided in one of the through holes 78 of the nut 72, can extend from at least the first end surface 73 of the nut 72. In particular, at least the head 82 can extend from the first end surface 73 of the nut 72. In this regard, in that the first end surface 73 can be flat or planar as discussed above, the head 82 may not be actuated to extend past (i.e., into) the body of the nut 72.

The other end of the fastener 80, which may be referred to herein as the free end of the fastener 80, may also extend from the body of the nut 72, particularly the second end surface 74, when the fastener 80 is threadedly provided in one of the through holes 78. Discussed in more detail below, according to one or more embodiments, the free end of the fastener 80 may be inside the body of the nut 72 when the nut 72 is threaded onto the first threaded portion 54 of the tie rod 50. After the nut 72 is threaded to a sufficient extent, for instance, when the second end surface 74 of the nut 72 abuts or is adjacent to an upper surface 39 of the body 33 of the hammer assembly 30, the fasteners 80 may be actuated, i.e., tightened, to extend or project from the second end surface 74 of the nut 72. Incidentally, the upper surface 39 of the body 33 of the hammer assembly 30 may not include receptacles (e.g., threaded holes) to receive the free ends of the fasteners 80. That is, the upper surface 39 can be flat or planar where the free ends of the fasteners 80 contact the upper surface 39. Therefore, the free ends of the fasteners 80 may directly contact the upper surface 39 but may not be retained in or by the body 33 of the hammer assembly 30.

Discussed in more detail below, as the fasteners 80 are actuated against the upper surface 39 of the body 33, the nut 72 can be caused to pull away from the upper surface 39 of the body 33. Since the nut 72 can be threadedly connected to the first threaded portion 54 of the tie rod 50, such movement of the nut 72 can cause the tie rod 50 to stretch. This can lead to the collar assembly 70 providing the clamping load for the tie rod 50, at least temporarily, which is also discussed in more detail below.

Embodiments of the disclosed subject matter can involve a kit for assembling, adjusting, and/or repairing a particular hammer assembly 30. The kit may be comprised of at least the collar assembly 70. The kit may have only one collar assembly 70. Alternatively, the kit can have multiple collar assemblies 70, for instance, the same number as a number of tie rods 50 associated with the particular hammer assembly 30. The kit may also be comprised of a plurality of the nuts 60. For instance, the kit may have the same number of nuts 60 as the number of tie rods 50. Optionally, the tool 90 may be part of the kit. According to one or more embodiments, the tie rods 50 may also be part of the kit.

INDUSTRIAL APPLICABILITY

As noted above, embodiments of the present disclosure can relate to systems and methods for tensioning one or more tie rods for a hammer tool.

Generally, embodiments of the disclosed subject matter can involve a tie rod torque method and system using a multi-fastener tensioner. The multi-fastener tensioner may be referred to herein as a collar assembly, for instance, collar assembly 70. Systems and methods according to embodiments of the disclosed subject matter can achieve a same clamp load for a tie rod, such as tie rod 50, with relatively less torque, for instance, compared to systems and methods that do not implement a multi-fastener tensioner according to embodiments of the disclosed subject matter.

Thus, one or more embodiments of the disclosed subject can provide an extended hammer tie rod (e.g., tie rod 50), where a multi-fastener tensioning nut (e.g., collar assembly 70) can be provided at the top of the tie rod, above a larger nut, i.e., the actual nut (e.g., nut 60) for the tie rod, and where, upon tightening the fasteners by a preset amount, the multi-fastener tensioning nut can create tension and stretch in the tie rod 50 so that the larger nut (e.g., nut 60) can be screwed down more easily using relatively less torque given by hand. The larger nut may then be further tightened using another tool (e.g., tool 90), followed by releasing the fasteners of the multi-fastener tensioning nut to transfer all the clamping load back to the larger nut. The multi-fastener tensioning nut can then be removed from the tie rod.

Figure 9:
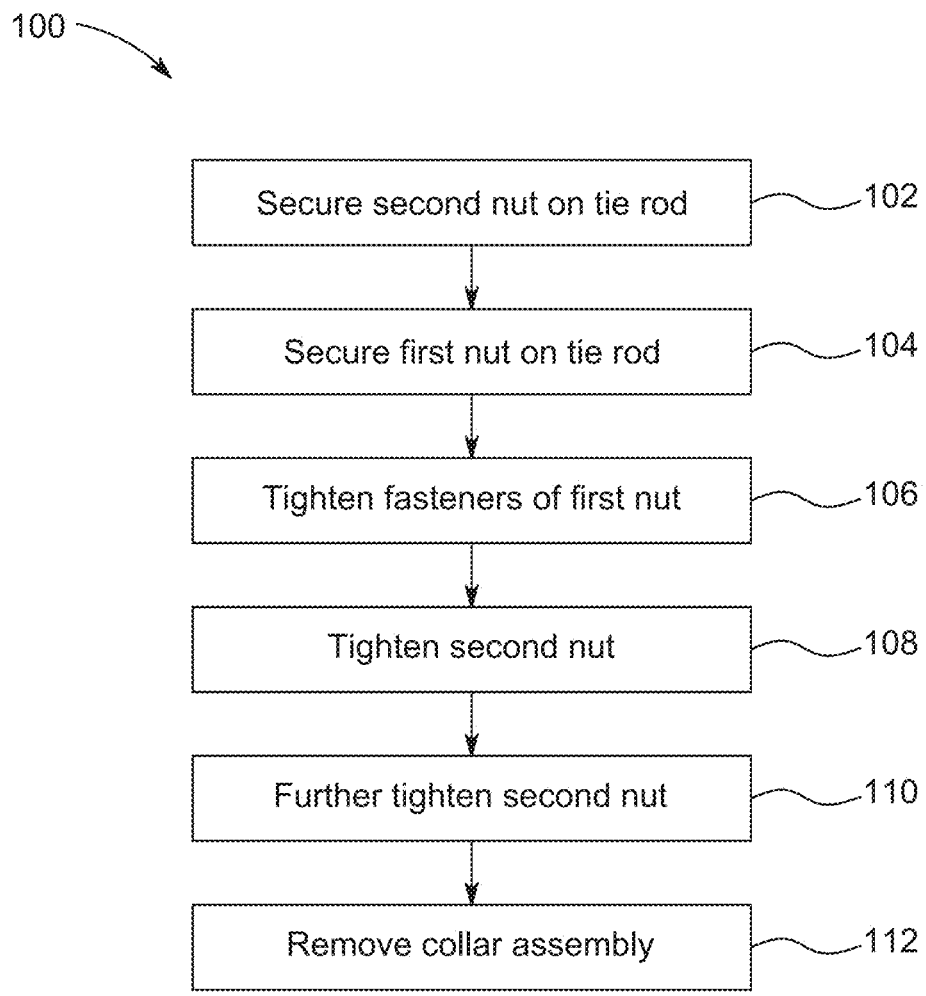
FIG. 9 is a flow chart of a method according to one or more embodiments of the disclosed subject matter.

Turning now to FIG. 8 and FIG. 9, these figures will be used to illustrate assembling of the tie rod 50 according to embodiments of the disclosed subject matter. Such assembling may include tensioning the tie rod 50. Such assembling can be applicable to all of the tie rods 50 of the hammer assembly 30.

The tie rod 50 can be provided within the interior of the body 33 of the hammer assembly 30. The second end portion 52 of the tie rod 50 can be secured to the lower portion 36 of the hammer assembly 30, for instance, via a nut or threaded collar threadedly connected to the second end portion 52 of the tie rod and engaged with the body 33 of the hammer assembly 30. The first end portion 51 of the tie rod 50 can be secured to the upper portion 31 of the hammer assembly 30.

At operation 102 of method 100 shown in FIG. 9, the nut 60 can be arranged within the body 33 of the hammer assembly 30. More specifically, the nut 60 can be threaded onto the second threaded portion 55 of the tie rod 50. The nut 60 may be arranged by hand tightening, at least in part by accessing the nut 60 via the window 38 formed in the body 33 of the hammer assembly 30. According to one or more embodiments, the second end 62 of the nut can contact or be adjacent to the internal seat 37 provided within the body 33 of the hammer assembly 30. At operation 102, the nut 60 can be positioned as shown in FIG. 6, as an example. Here, the nut 60 can be tightened such that the tie rod 50 has no slack.

At operation 104 of method 100, the collar assembly 70 can be threaded onto the first threaded portion 54 of the tie rod 50. In particular, the nut 72 can be threaded onto the first threaded portion 54 of the tie rod 50. The nut 72 may be threaded onto the second threaded portion 54 with or without the fasteners 80.

In a case where the fasteners 80 are provided, the fasteners 80 can extend from at least the first end surface 73 of the nut 72 as the collar assembly 70 is threaded onto the first threaded portion 54. The free ends of the fasteners 80 opposite the heads 82 may also extend from the body of the nut 72 at the time of installation of the nut 72 or in any case, later, to tension the tie rod 50 using the collar assembly 70. Thus, according to one or more embodiments, at operation 104 the nut 72 can be threaded onto the first threaded portion 54 of the tie rod 50 until the second end surface 74 contacts or is adjacent to the upper surface 39 of the body 33 of the hammer assembly 30. In such a case, as an example, the free ends of the fasteners 80 can be flush with the second end surface 74 of the nut 72. Alternatively, if the free ends of the fasteners 80 extend from the body of the nut 72 at the time of installation of the nut 72 on the tie rod 50, the free ends of the fasteners 80 can contact the upper surface 39 of the body 33.

In any event, at operation 106 the fasteners 80 can be tightened against the upper surface 39 of the body 33 using, for instance, a wrench or the like, depending upon the configuration of the heads 82 of the fasteners 80. The fasteners 80 can be tightened according to a predetermined pattern, such as clockwise, counterclockwise, or opposing pairs of fasteners 80.

The fasteners 80, as they are tightened, can extend from (or further extend from) the second end surface 74 of the nut 72 and push against the upper surface 39 of the body 33 of the hammer assembly 30. This can cause the collar assembly 70, which can be threaded to the first threaded portion 54 of the tie rod 50, to pull away from the upper surface 39 of the body 33 and apply tension to the tie rod 50. A gap can thus be created between the second end surface 74 of the nut 72 and the upper surface 39 of the body 33.

The fasteners 80 can be tightened by a preset amount or distance d1, as shown in FIG. 8, for instance. Such preset distance d1 may be defined from the second end surface 74 of the nut 72 to the free end of the fastener 80. The preset distance d1 may also correspond to the gap created between the second end surface 74 of the nut 72 and the upper surface 39 of the body 33.

The preset distance d1 can be set based on an amount by which the fastener 80 can be screwed in to achieve a desired amount of stretch and clamp load for the tie rod 50. For instance, if the tie rod 50 is desired to be stretched by 4.0 mm, the length of the threaded body 84 of the fastener 80 can be set such that tightening the fastener 80 by 4.0 mm can stretch the tie rod 50 by 4.0 mm. The amount of stretch can correspond to a predetermined clamp load desired to be exerted on the tie rod 50. Here, providing the clamp load by tightening the fasteners 80 may be referred to or characterized as preloading the tie rod 50 (using the collar assembly 70).

According to one or more embodiments, the amount by which the head 82 of the fastener 80 is spaced from the first end surface 73 of the nut 72 can correspond to the preset distance d1. In this regard, as noted above, the first end surface 73 of the nut 72 can be flat or planar. The heads 82 of the fasteners 80, therefore, may not extend past (i.e., into) the body of the nut 72. For instance, all heads 82 of the fasteners 80 can contact the first end surface 73 of the nut 72 to provide the preset stretch and clamp load for the tie rod 50. Additionally, the distance between the free end of the fastener 80 and the bottom of the head 82 of the fastener 80 can be equal to the thickness of the nut 72 plus the desired amount by which the free end of the fastener 80 can project from the second end surface 74 of the nut 72. Thus, the distance from the head 82 to the first end surface 73 of the nut 72 can dictate the amount by which the free end of the fastener 80 can be extended (or further extended) to provide the preset stretch and clamp load for the tie rod 50. Of course, the desired amount of stretch may not necessarily lead to the heads 82 of the fasteners 80 abutting the first end surface 73 of the nut 72.

The tightening of the fasteners at operation 106 can also lead to movement of the nut 60. In particular, since the nut 60 and the nut 72 are coupled to the tie rod 50, movement of the nut 72 by the preset distance d1 can also move the nut 60 by approximately the distance d1. Such movement of the nut 60 due to elongation of the tensioned tie rod 50 can pull the nut 60 away from the internal seat 37.

At operation 108 the nut 60 may be manipulated toward the internal seat 37. Such movement may be characterized as tightening. For instance, the nut 60 may be manipulated by hand to abut or be adjacent to the internal seat 37. According to one or more embodiments, such manipulation can be via the window 38.

At operation 110, the nut 60 can be tightened against the internal seat 37 with rotation of the nut 60 causing threaded inner sidewall 63 to cooperate with the second threaded portion 55 of the tie rod 50 and cause the nut 60 to move parallel to the central longitudinal axis A. Such tightening may be referred to or characterized as further tightening the nut 60. The torque applied at operation 110 can be greater than the torque applied at operation 108. According to one or more embodiments, the tool 90 may be used to tighten the nut 60 at operation 110. After tightening the nut 60 the tool 90 may be disengaged from the nut 60.

After the nut 60 has been suitably tightened at operation 110, at operation 112 the collar assembly 70 can be removed from the tie rod 50. Such removal can include loosening the collar assembly 70. This can involve loosening the fasteners 80 such that the free ends of the fasteners 80 no longer contact the upper surface 39 of the body 33. The nut 72 can then be unthreaded from the first threaded portion 54 of the tie rod 50. Loosening the collar assembly 70 can transfer the clamping load from the collar assembly 70 to the nut 60.

The operations 102-112 may be repeated for one or more additional tie rods 50 of the hammer assembly 30. With the clamping loads provided by nuts 60 tightened to respective tie rods 50 according to embodiments of the disclosed subject matter, the hammer tool 40 may be operated. Notably, the collar assembly 70 may not be provided on any of the tie rods 50 during operation of the hammer tool 40.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

The invention claimed is:

1. A tie rod torque system comprising:
   a collar assembly including a first collar and a plurality of fasteners extending through respective threaded holes of the first collar; and
   a hydraulic hammer assembly, the hydraulic hammer assembly including:
      a body,
      a plurality of tie rods running in a length-wise direction of the body at respective corner portions of the body, each of the tie rods including at a proximal end portion thereof:
         a first threaded portion having a first diameter,
         a second threaded portion having a second diameter, and
         a first non-threaded portion between the first threaded portion and the second threaded portion, the first non-threaded portion having a diameter less than the first diameter and the second diameter, and
      a plurality of second collars threadedly connected to the second threaded portion of respective ones of the tie rods,
   wherein the first collar is configured to be removably threadedly connected individually to the first threaded portion of each of the tie rods, and
   wherein the fasteners of the collar assembly abut an upper surface of the body of the hydraulic hammer assembly under a condition that the first collar is removably threadedly coupled to the first threaded portion of any one of the tie rods.

2. The tie rod torque system according to claim 1, wherein each of the second collars includes a plurality of receptacles to removably receive a tool to adjust tightness of the second collar against the body of the hydraulic hammer assembly.

3. The tie rod torque system according to claim 2, wherein the receptacles are accessible via a window in the body of the hydraulic hammer assembly.

4. The tie rod torque system according to claim 1, wherein each of the second collars abuts an internal ledge of the body of the hydraulic hammer assembly.

5. The tie rod torque system according to claim 1, wherein the threaded holes of the first collar and the fasteners are symmetrically arranged about the first collar at a same distance from a central longitudinal axis passing through a central opening of the first collar.

6. The tie rod torque system according to claim 1, wherein, for each of the second collars, the second collar provides an entirety of a clamping load for the respective tie rod upon removal of the first collar from the respective tie rod.

7. The tie rod torque system according to claim 1, wherein the first collar has a first end surface and a second end surface opposite the first end surface, each of the first end surface and the second end surface being flat from the threaded holes radially inward to an inner sidewall of the first collar.

8. The tie rod torque system according to claim 1,
wherein an entire length of each of the threaded holes is threaded,
wherein the first collar has a first end surface and a second end surface opposite the first end surface,
wherein heads of the fasteners directly contact the first end surface of the first collar, and
wherein the second diameter of the second threaded portion is greater than the first diameter of the first threaded portion.

9. A tie rod torque system comprising:
a collar assembly including a first collar and a plurality cif fasteners extending through respective threaded holes of the first collar; and
a hydraulic hammer assembly, the hydraulic hammer assembly including:
a body,
a plurality of tie rods running in a length-wise direction of the body at respective corner portions of the body, each of the tie rods including at a proximal end portion thereof:
a first threaded portion having a first diameter,
a second threaded portion having a second diameter, and
a first non-threaded portion between the first threaded portion and the second threaded portion, the first non-threaded portion having a diameter less than the first diameter and the second diameter, and
a plurality of second collars threadedly connected to the second threaded portion of respective ones of the tie rods,
wherein the first collar is configured to be removably threadedly connected individually to the first threaded portion of each of the tie rods,
wherein threading of the first threaded portion is different in form compared to threading of the second threaded portion, and
wherein the collar assembly abuts an upper surface of the body of the hydraulic hammer assembly under a condition that the first collar is removably threadedly coupled to the first threaded portion of any one of the tie rods.

10. The tie rod torque system according to claim 9, wherein the second diameter of the second threaded portion is greater than the first diameter of the first threaded portion.

11. The tie rod torque system according to claim 9,
wherein the first collar has a first end surface and a second end surface opposite the first end surface, and
wherein heads of the fasteners directly contact the first end surface of the first collar.

* * * * *